(12) United States Patent
Lin et al.

(10) Patent No.: US 6,546,169 B1
(45) Date of Patent: Apr. 8, 2003

(54) PUMP COUPLERS FOR DOUBLE-CLAD FIBER DEVICES

(75) Inventors: Hong Lin, Palo Alto, CA (US); Dong Peng, Palo Alto, CA (US)

(73) Assignee: Calmar Optcom, Inc., Mountain View, CA (US)

( * ) Notice: Subject to any disclaimer, the term of this patent is extended or adjusted under 35 U.S.C. 154(b) by 27 days.

(21) Appl. No.: 09/862,681

(22) Filed: May 21, 2001

Related U.S. Application Data
(60) Provisional application No. 60/206,131, filed on May 22, 2000.

(51) Int. Cl.[7] .................................................. G02B 6/32
(52) U.S. Cl. .............................. 385/39; 385/33; 385/46; 385/34; 385/74; 385/27; 385/43
(58) Field of Search ............................ 385/33, 34, 39, 385/115, 24, 15, 27, 30, 31, 43, 47, 50–52, 74; 359/341

(56) References Cited

U.S. PATENT DOCUMENTS

| | | | |
|---|---|---|---|
| 5,323,404 A | | 6/1994 | Grubb |
| 5,608,831 A | * | 3/1997 | Pan .............................. 385/33 |
| 5,815,518 A | | 9/1998 | Reed et al. |
| 5,889,904 A | * | 3/1999 | Pan et al. .................... 359/131 |
| 5,966,480 A | | 10/1999 | LeGrange et al. |
| 6,185,347 B1 | * | 2/2001 | Zheng .......................... 385/16 |
| 6,212,305 B1 | * | 4/2001 | Pan .............................. 385/11 |
| 6,278,816 B1 | * | 8/2001 | Keur et al. ..................... 385/29 |
| 6,400,862 B1 | * | 6/2002 | Liu et al. ....................... 385/24 |

* cited by examiner

Primary Examiner—Hemang Sanghavi
Assistant Examiner—Scott A Knauss
(74) Attorney, Agent, or Firm—Fish & Richardson P.C.

(57) ABSTRACT

Techniques and devices that optically couple multiple pump fibers and a signal input fiber to a double-clad fiber with a high coupling efficiency.

9 Claims, 2 Drawing Sheets

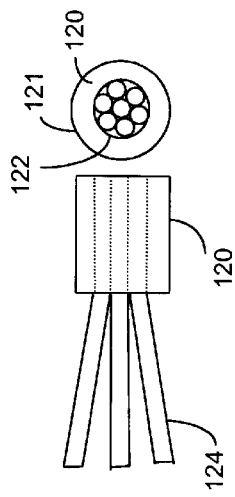
FIG. 1A
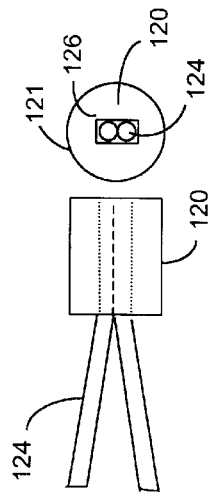
FIG. 1B
FIG. 1C
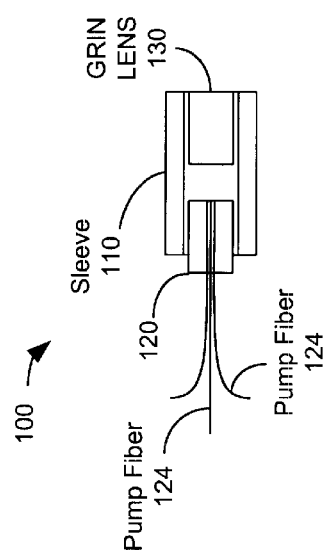
FIG. 2A
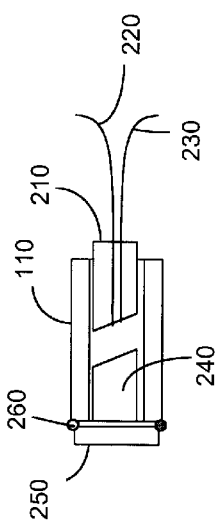
FIG. 2B
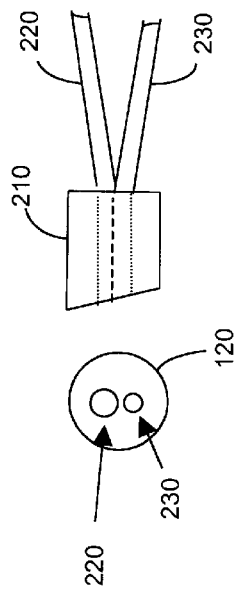

PUMP COUPLERS FOR DOUBLE-CLAD FIBER DEVICES

This application claims the benefit of U.S. Provisional Application No. 60/206,131, filed on May 22, 2000.

BACKGROUND

This application relates to optical fiber devices, and more specifically, to techniques for coupling optical pump light into a double-clad fiber device and devices employing the same.

An optical fiber-may be designed to operate as an optical gain medium. In general, the core of such an optical fiber may be doped with certain active ions such as erbium and other rare earth ions to produce the desired optical gain by receiving optical pump light at a desired pump wavelength. Hence, when optically pumped at the pump wavelength (e.g., near 0.98 micron), the doped fiber core absorbs the pump light to produce light at an emission wavelength different from the pump wavelength (e.g., near 1.55 micron). Such a doped-fiber may be used to form various fiber devices, including but not limited to, a fiber laser for producing a laser at the emission wavelength and a fiber optical amplifier to amplify an optical signal at the emission wavelength.

The above doped fiber may be made in a double-clad configuration which includes an inner cladding layer to surround the fiber core and to have an index of refraction less than that of the fiber core. This inner cladding layer forms a cladding optical waveguide along the fiber that supports multiple modes and has a cross section area much greater than that of the fiber core to achieve a large numerical aperture. There may be least one outer cladding layer with an index of refraction less than that of the inner cladding layer formed outside the inner cladding layer. In operation, the pumplight is first coupled into the inner cladding layer to propagate in the cladding wave guide along the fiber. The pump light in the inner cladding layer then interacts with the fiber core and is absorbed by the doped ions. Since the pump is coupled into the core through the fiber cladding, the double-clad fiber is also referred to as a cladding-pumped fiber.

The cladding pumping can be efficient since the pump light is coupled through the large cross section of the inner cladding layer. High-power multi-mode pump sources may now be used to produce pump light for the double-clad fiber devices. In addition, the absorption of the pump light by the fiber core is extended over the interface between the inner cladding layer and the fiber core. Therefore, a high pump power level may be achieved in the fiber core without exceeding the damage threshold intensity for the fiber core.

SUMMARY

This application includes techniques and devices that optically couple multiple pump fibers and a signal input fiber to a double-clad fiber with a high coupling efficiency.

BRIEF DESCRIPTION OF THE DRAWINGS

FIG. 1A shows one embodiment of a pump fiber collimator that has a pump bundle pigtail with two or more pump fibers and a first collimator lens.

FIGS. 1B and 1C show two examples of the pump bundle pigtail in FIG. 1A that uses a ferrule to engage the pump fibers into a fiber bundle.

FIG. 2A shows one embodiment of a double-clad fiber collimator that engages a double-clad fiber and an input fiber to a second collimator lens FIG. 2B shows the technique to engage the double-clad fiber and the input fiber together in the double-clad fiber collimator in FIG. 2A.

DETAILED DESCRIPTION

Figures 3, 4, 5:
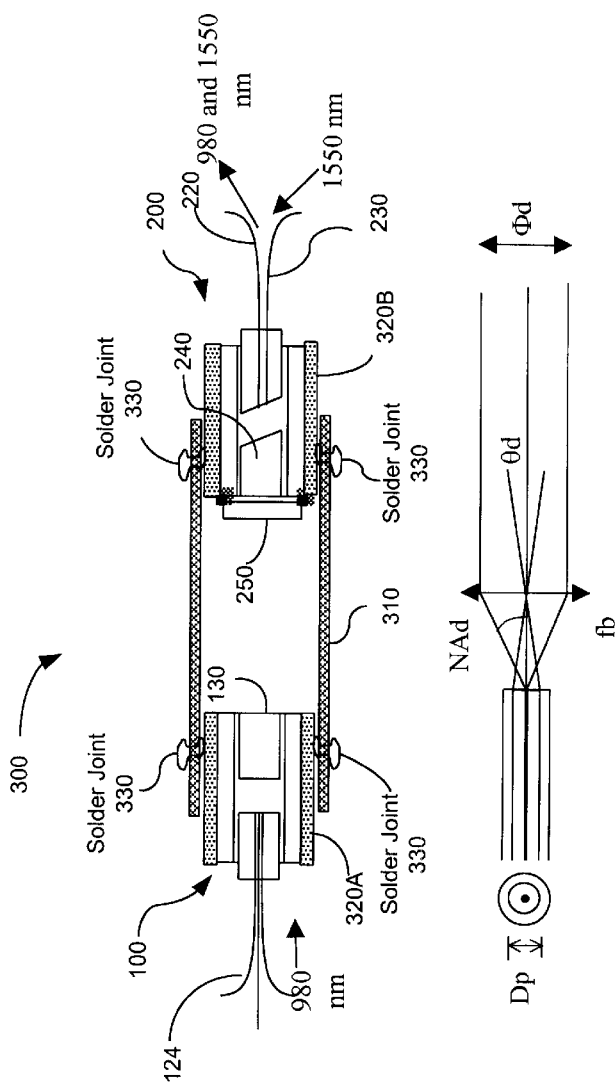
FIG. 3 shows one embodiment of a pump fiber coupler for coupling pump light from multiple pump fibers and a signal beam from the input fiber into the double-clad fiber for amplification by using the collimators in FIGS. 1A and 2A.
FIG. 4 illustrates the operation of coupling light by a collimator lens into a fiber.
FIG. 5 shows another embodiment of a pump fiber coupler for coupling pump light from multiple pump fibers and a signal beam from the input fiber into the double-clad fiber for amplification by using modified collimators based on the designs in FIGS. 1A and 2A.

The present techniques engage multiple pump fibers to form a pump fiber bundle to supply pump light to a double-clad fiber. Each pump fiber may be a multi-mode fiber so that a multi-mode pump beam with a high power may be used as one of the pump beams.

FIG. 1A shows one embodiment of a pump fiber collimator 100 that has a pump bundle pigtail with two or more pump fibers 124 in a fiber ferrule 120 and a first collimator lens 130. The fiber ferrule 120 with a tubular body may be formed of a number of materials, including glass, quartz, metals such as stainless steel, or ceramics. A sleeve 110, typically in a cylindrical tubular design, may be used to hold and align the pump bundle pigtail and the lens 130 at their selected relative positions so that the output pump beams from the pump fibers 124 are substantially collimated after pass through the lens 130. Referring to FIG. 3, the sleeve 110 of the pump fiber bundle coupler 100 may have an elongated, rigid tubular body with a cylindrical exterior 112 and a cylindrical interior 114. In one implementation, the sleeve 110 may be a split sleeve in which a longitudinal slit may be formed from one end to the other along the longitudinal direction of the sleeve 110. This slit allows adjustment of relative positions of fiber ferrule 120 and the lens 130 during assembly. Various materials may be used for the sleeve 110, such as glass materials like Zirconia and Phosphor Bronze. The lens 130 may be any suitable lens such as a GRIN lens.

FIG. 1B shows one implementation of the pump bundle pigtail in FIG. 1A. The pump fiber ferrule 120 has a tubular body to hold distal terminals of pump fibers 124 together to form a pump fiber bundle. End facets of the bundled fiber terminals are polished to form an optical pump coupling surface for outputting pump light. The other distal terminals of the pump fibers 124 are coupled to pump light sources such as multi-mode diode lasers or diode laser arrays to receive pump light. A suitable adhesive such as epoxy may be used to bond the pump fibers 124 and fix the bundled terminals of the pump fibers 124 to the interior 122 of the pump fiber ferrule 120. This way of forming the pump fiber bundle may be used to avoid the fiber fusion method for forming the bundle. The end facets of bundled terminals of the pump fibers 124 are polished to an optical finish. In addition, the end facets may be coated with an anti-reflective coating to reduce loss due to optical reflection. The pump fiber ferrule 120 may include a cylindrical exterior 121 and a cylindrical interior 122 that is substantially concentric with the exterior 121. The pump fibers 124 may be symmetrically arranged in the interior 122. In the illustrated example, seven pump fibers 124 may be held by the pump fiber ferrule 120 where one pump fiber is positioned in the center of the interior 122 and six pump fibers are positioned to form a circle around the center pump fiber. As described in the following, the center pump fiber may be replaced with an input fiber, usually in a single-mode design, to supply a signal beam to the double-clad fiber for amplification.

FIG. 1C shows another implementation of the pump bundle pigtail in FIG. 1A in which the pump fiber ferrule 120, although still has a tubular body with the same cylindrical exterior 121, has a non-cylindrical interior 126. In this example, the interior 126 is elongated to hold a linear array of pump fibers 124 which may be symmetrically arranged in the interior 122.

FIG. 2A shows one embodiment of a double-clad fiber collimator 200 that engages a double-clad fiber 220 and an input fiber 230 to a second collimator lens 240. FIG. 2B shows the technique to engage the double-clad fiber and the input fiber together in the double-clad fiber collimator in FIG. 2A. The double-clad fiber 220 is a doped fiber and may be a single-mode fiber. The input fiber 230 may also be a single mode fiber to carry an input optical signal to be coupled into the core of the double-clad fiber 220 and to be amplified. A fiber ferrule 210 has a tubular body with a cylindrical exterior to hold the fibers 220 and 230 symmetrically with respect to the axis of the cylindrical exterior. In addition, the fiber ferrule 120 has an end facet 122 that is cut at an acute angle (e.g., about 8 degrees) with respect to a plane perpendicular to the fibers 220 and 230 so that the end facets of the fibers 220 and 230 are polished to form the same acute angle. This is to reduce undesired optical reflection.

The lens 240 generally may be any suitable lens couple the collimated pump light and the signal beam to be amplified into the double-clad fiber 220. If a GRIN lens is used, it may be configured to have substantially the same cylindrical exterior profile as the fiber ferrule 210. The end facet of the GRIN lens 240 facing the fiber ferrule 210 may be angle polished to be parallel to the angle-polished facet of the ferrule 210 for reducing unwanted optical reflection.

In this particular implementation, the double-clad fiber collimator 200 also implements an optical filter 250 on the opposite side of the lens 240 with respect to the fiber ferrule 210. The filter 250 is specially designed to reflect the signal light to be amplified in the double-clad fiber 220 and to transmit the pump light. Hence, the signal light from the input fiber 230 is reflected by the filter 250 and is coupled into the double-clad fiber 220 by the lens 240. The pump light can transmit through the filter 250 and is coupled by the lens 240 into the double-clad fiber 220. For an Er/Yb double clad fiber, the signal light is within the approximate range of 1520 nm–1620 nm and the pump light is within the approximate range of 900 nm–1000 nm. With fine adjustment of the fiber pigtail during the manufacturing process, the light in the single mode core of a double clad fiber can be coupled into the single mode fiber with a high coupling efficiency.

Similar to the construction of the pump fiber collimator 100, a sleeve 110, typically in a cylindrical tubular design, may be used to hold and align the fiber ferrule 210, the lens 240 at their selected relative positions for efficiently coupling into the double-clad fiber 220. The filter 250 may be positioned closely to the lens 260 and may be engaged to the end facet of the sleeve 110 by, e.g., adhesive joints 260.

The double-clad fiber 220 may include a fiber core doped with rare-earth ions as a laser gain medium for producing gain at an emission wavelength, an inner cladding layer surrounding the fiber core, and an outer cladding layer surrounding the inner cladding layer. Additional layers may also be formed outside the outer cladding layer. The fiber core and the inner cladding layer may be formed of glass materials such as silica. The outer cladding layer may be a low-index polymer material. In general, the cross section of the fiber core may be circular and the cross section of the inner cladding layer may be circular or non-circular. It is desirable that the respective refractive indices $n_c$, $>n_{ic}$, $>$ and $n_{oc}$ of the core, the inner cladding layer, and the outer cladding layer satisfy a condition of $n_c > n_{ic} > n_{oc}$. Under this condition, the double-clad fiber 220 effectively has two optical waveguides. The first waveguide is formed of the fiber core and bounded by the inner cladding layer. This may be either a single-mode waveguide or a multi-mode waveguide. For many applications, the fiber core and the inner cladding layer may be designed to form a single-mode waveguide. The second waveguide is the cladding waveguide formed of the inner cladding layer and bounded by the outer cladding layer. The inner cladding layer may have a large cross section so that the second waveguide supports multiple modes. Accordingly, various pump sources, such as both single-mode and multi-mode lasers, especially multi-mode lasers with high output powers, may be used to provide pump light into inner cladding layer of the fiber 220.

In operation, once the pump light is properly coupled into the inner cladding layer, it is confined within the outer cladding layer and bounces back and forth by the interface between the inner and outer cladding layers to propagate along the fiber 220. The confined pump light becomes absorbed by the fiber core to excite the doped ions to produce the desired optical gain at the emission wavelength whenever it passes through the fiber core.

The above pigtail fiber collimators 100 and 200 may be combined to form a pump coupler so that the pump light from the pump fibers 124 and the signal beam from the input single-mode fiber 230 can be coupled into the double-clad fiber 230. FIG. 3 shows one embodiment of such a pump coupler 300. This pump coupler may be used in a double-clad fiber amplifier or laser. The pump coupler 300 uses an outer coupler tube 310 to hold and align the collimators 100 and 200 relative to each other. The first collimator lens 130 faces the filter 250 or the second collimator 240 so that the divergent pump light from the pump fibers 124 is collimated by the first lens 130, passes through the filter 250, and finally, is focused by the second lens 240 into the double-clad fiber 220.

Two cylindrical inner collimator tubes 320A and 320B may be used to facilitate mechanically engaging the collimators 100 and 200 to the outer coupler tube 310. The exteriors of the tubes 320A and 320B is slightly small than the interior of the outer coupler tube 310 and the interiors of the tubes 320A and 320B conform to the exteriors of the collimators 100 and 200, respectively. Hence, each collimator can slide into the respective inner tube and tightly fit therein. In addition, an adhesive may be used to adhere the collimator to the inner tube. The inner tubes 320A and 320B can then side into the outer coupler tube 310 and be engaged and fixed by using a suitable adhesive or soldering.

In the implementation illustrated in FIG. 3, the tubes 310, 320A, and 320B are formed of a metal and are gold plated or treated so that solder can be adhered easily. At least one solder hole 330 is formed near each end of outer metal tube 310. Three to four solder holes 330 may be formed evenly around the circumference of the outer tube 310. In assembly, the two fiber pigtail collimators 100 and 200 in the tubes 320A and 320B may be placed on an adjustment stage, which can adjust the relative position and angle between two fiber pigtail collimators 100 and 200. Pump light is injected into multi-mode fibers 124 and the pump light coupled into the double clad fiber 220 is monitored. By adjusting the relative angles and position of two fiber pigtail collimators 100 and 200 within an adjustment stage, the pump light coupled into double clad fiber 220 can be maximized or optimized. After the optimization of coupling of pump light, the solder is applied to the solder holes 330 to fix the relative position of the two fiber pigtail collimators 100 and 200. Then the whole pump coupler 300 is put into a protective housing with two end caps and strain relief.

In order to obtain high efficiency coupling of signal light (1550 nm) in the pump coupler 300, the core size and numerical aperture of the single-mode input fiber 230 should closely match or be equal to those of the single-mode core of the double clad fiber 220. This is in part because the signal light from the input fiber 230 and the double-clad fiber 230 share the same collimator lens 240. In operation, the generally-divergent signal light from the input fiber 230 is first collimated by the lens 240 and then, upon reflection by the filter 250, is focused by the lens 240 into the double-clad fiber 240. Hence, the single-mode fiber cores of the fibers 220 and 230 should close in this configuration. For example, if the core size of single mode fiber 230 is 9 microns in diameter, the core size in double clad fiber 220 should also about 9 microns in diameter. The focal length of the lenses 130 and 240, which may be GRIN lenses, should be carefully chosen order to obtain high efficiency coupling of pump light (980 nm) in the pump coupler 300.

FIG. 4 illustrates the focusing characteristics of a collimator lens in coupling light into the double-clad fiber, the diameter of the collimating light, $\Phi d$, is related to the numerical aperture of pump cladding, Nad, by the following equation:

$$\Phi d = 2 \cdot NAd \cdot fb,$$

where fb is the focal length of the lens 240 in the fiber pigtail collimator 200. The divergence of the pump light $\theta p$ is related to the diameter of pump cladding, Dp, by $$\theta d = Dp/fb/2$$

The output beam diameter and its divergence from the fiber bundle collimator 100 can be similarly determined. For a 7-fiber bundle as shown in FIG. 1B, the beam diameter Fb the diameter of the collimating light is related to the numerical aperture of multimode fiber, NAm, by $$\Phi b = 2 \cdot NAm \cdot fa$$

where fa is the focal length of the lens 130 in the collimator 100. The divergence of the pump light qb is related to the diameter of multimode fiber, Dm, by $$\theta b = 3 \cdot Dm/fa/2,$$

The factor 3 is due to 7-fiber arrangement result in 3 times equivalent diameter.

In order to achieve near 100% coupling efficiency, the beam diameter $\Phi b$ of the fiber bundle of the fibers 124 should be less than beam diameter (d of the double clad collimator 200:

$$\Phi b < \Phi d,$$

and the divergence of fiber bundle $\theta b$ should be less than the divergence of double clad fiber $\theta d$:

$$\Phi d < \Phi d.$$

In a practical example where NAm=0.12, Dm=125 um, Dp=200 um, Nad=0.45, the GRIN lens 130 and GRIN lens 240 can be chosen so that fa=3.0 mm, fb=1.5 mm, respectively. Due to the large size of multimode pump fibers 124, the above alignment procedure should have a relatively large tolerance compare to alignment in coupling from one single-mode fiber to another single-mode fiber.

FIG. 5 shows another embodiment of a pump coupler 500 for coupling pump light from multi-mode fibers 124 and signal light from the input fiber 230 into the double-clad fiber 220. The input fiber 230, however, is no longer held in the double-clad collimator 200. Instead, the pump collimator 100 is used to hold the input fiber 230. The input fiber 230 may be positioned in the center of the fiber ferrule 120 with pump fibers 124 arranged around it. The filter 250 is also removed from the collimator 200. In this configuration, the signal light from the input fiber 230, along with pump light from pump fibers 124, is first collimated by the first collimator lens 130, and then is focused by the second collimator lens 240 into the double-clad fiber 220. The opposing facets of the fiber ferrule 120 (hence the end facets of pump fibers 124 and the input fiber 230) and the GRIN lens 130 may be angle-polished to be substantially parallel to each other for reducing optical reflection. In this design, since the signal light from the input fiber 230 is first collimated by the lens 130, the fiber core size of the input fiber 230 can be different the core size of double clad fiber 220. By properly choosing the focal length of the lens 130, high coupling efficiency can be achieved. The alignment of the coupler 500 may need be more precise than the design in FIG. 3.

The above pump couplers can use micro-optics components and operate to deliver lights from several pump lasers into double-clad gain fiber, and also to couple the light either from the single mode core of double clad fiber into a single mode fiber or from a single mode fiber to the single mode core of double clad fiber. The lens in this invention can be any lens (not limited to GRIN lens). Double-clad fibers generally can be any kind of double-clad fibers, including but not limited to Er, Er/Yb, Yb doped double-clad fibers. Single-mode pump fibers may also be used to replace multi-mode pump fibers. The wavelengths can be any wavelengths appropriate for the double-clad fibers used in these couplers.

Although the present disclosure only includes a few embodiments, it is understood that various modifications and enhancements may be made without departing from the following claims.

What is claimed is:

1. A fiber device, comprising:

a sleeve having an elongated tubular body with an input terminal and an output terminal;

an optical filter attached to said input terminal and configured to transmit light in a pump spectral range and reflect light in a signal spectral range at wavelengths longer than any wavelength in said pump spectral range;

a collimator lens disposed in said sleeve near said input terminal to receive light from said optical filter;

a double-clad fiber ferrule placed in said sleeve at said output terminal;

a double-clad fiber having a fiber core, an inner cladding layer surrounding said fiber core, and an outer cladding layer surrounding said inner cladding layer, said double-clad fiber further including a pump-receiving terminal coupled to said double-clad fiber ferrule to receive light from said collimator lens; and an input fiber bundled in said double-clad fiber ferrule along with said double-clad fiber and configured to carry signal light at a signal wavelength in said signal spectral range.

2. The device as in claim 1, wherein end facets of said double-clad fiber and said input fiber form an angle-polished surface facing said collimator lens.

3. The device as in claim 1, wherein said collimator lens is a GRIN lens.

4. The device as in claim 1, wherein a fiber core size of said double-clad fiber is substantially equal to a fiber core size of said input fiber.

5. The device as in claim 4, wherein both said double-clad fiber and said input fiber are single-mode fibers.

6. A fiber device, comprising:

an outer tube having a pump input terminal and a double-clad output terminal;

a first fiber collimator positioned within said outer tube at said double-clad output terminal and configured to have: (1) a first sleeve having an elongated tubular body with an input terminal and an output terminal, (2) an optical filter attached to said input terminal and configured to transmit light in a pump spectral range and reflect light in a signal spectral range at wavelengths longer than any wavelength in said pump spectral range, (3) a first collimator lens disposed in said first sleeve near said input terminal to receive light from said optical filter, (4) a double-clad fiber ferrule placed in said first sleeve at said output terminal, (5) a double-clad fiber having a fiber core, an inner cladding layer surrounding said fiber core, and an outer cladding layer surrounding said inner cladding layer, said double-clad fiber further including a pump-receiving terminal coupled to said double-clad fiber ferrule to receive light from said collimator lens, and (6) an input fiber bundled in said double-clad fiber ferrule along with said double-clad fiber and configured to carry signal light at a signal wavelength in said signal spectral range; and a second fiber collimator positioned within said outer tube at said pump input terminal and configured to have: (1) a second sleeve having an elongated tubular body with an input terminal and an output terminal, (2) a pump fiber ferrule placed in said second sleeve at said input terminal, (3) a plurality of pump fibers bundled together at one fiber terminals by said pump fiber ferrule to form a pump fiber bundle, wherein end facets of said bundled fiber terminals are polished to form an optical pump coupling surface for outputting pump light from said pump fibers in said pump spectral range, and (4) a pump collimator lens disposed in said second sleeve at said output terminal to receive and collimate said pump light and direct said pump light to said optical filter of said first fiber collimator.

7. The device as in claim 6, wherein at least one of said collimator lenses is a GRIN lens.

8. The device as in claim 6, wherein a fiber core size of said double-clad fiber is substantially equal to a fiber core size of said input fiber.

9. The device as in claim 6, wherein both said double-clad fiber and said input fiber are single-mode fibers.

* * * * *